(No Model.)
J. A. EVARTS.
EXTENSION LAMP FIXTURE.
No. 324,760. Patented Aug. 18, 1885.
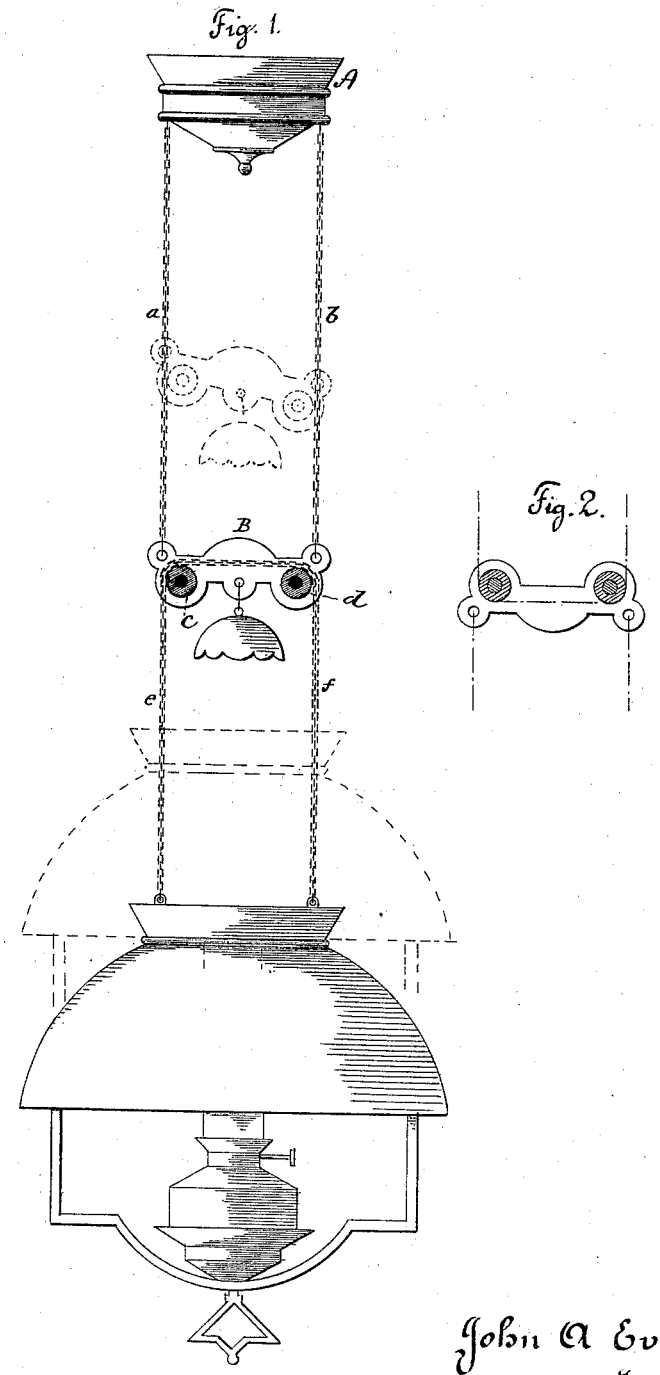

UNITED STATES PATENT OFFICE.

JOHN A. EVARTS, OF MERIDEN, CONNECTICUT, ASSIGNOR TO THE BRADLEY & HUBBARD MANUFACTURING COMPANY, OF SAME PLACE.

EXTENSION LAMP-FIXTURE.

SPECIFICATION forming part of Letters Patent No. 324,760, dated August 18, 1885.

Application filed July 13, 1885. (No model.)

*To all whom it may concern:*

Be it known that I, JOHN A. EVARTS, of Meriden, in the county of New Haven and State of Connecticut, have invented a new Improvement in Extension Lamp-Fixtures; and I do hereby declare the following, when taken in connection with accompanying drawings and the letters of reference marked thereon, to be a full, clear, and exact description of the same, and which said drawings constitute part of this specification, and represent, in—

Figure 1, a side view of the fixture, showing a longitudinal section of the auxiliary or intermediate hanger, the intermediate hanger attached to the chains extending down from the principal hanger above, and the loop formed in the chains extending up from the thing suspended; Fig. 2, the same hanger inverted, making the loop in the chains which extend down from the principal hanger, and connecting the auxiliary hanger with the chains from the thing suspended.

This invention relates to an improvement in that class of lamp-fixtures which are suspended from the ceiling, and adjustable by means of a spring-drum, so that the chains or cords, as the lamp is pulled downward, serve to wind the spring. Then the reaction of the spring in its turn serves to rewind the cords or chains upon the drum, and so as to hold the lamp at any desired elevation, and particularly to that class of suspending devices in which two chains or cords are employed. In such construction it has been the general practice to attach one end of the chains to the drum and the lower ends to the lamp-fixture; but in winding onto the drums the chain is liable to run upon itself, so that that side will take up faster than upon the other; hence will tilt the movable part of the fixture out of its proper horizontal plane.

The object of my invention is to avoid this tilting of the lamp from any displacement or irregular running of the lifting-chains; and it consists in a hanger intermediate between the springs and the movable part of the fixture, with two chains extending downward from the spring and two chains extending upward from the movable part of the fixture to the intermediate hanger, one of the pairs of chains connected over bearings on the hanger in the form of a loop, the ends of the other two chains permanently fixed to the hanger, and whereby the loop-like connection of one pair of chains around bearings on the middle hanger will permit the loop to work on said bearings, and thereby maintain the horizontal position of the movable part of the fixture.

A represents the principal hanger, in which the spring-drum for the chains is arranged in the usual manner. From this drum two chains, $a\ b$, extend downward in the usual manner, and so that as the drum revolves the two chains will be wound thereon, one from one side and the other from the opposite side, so as to draw substantially alike on both chains.

B is the intermediate or auxiliary hanger, which may be in the form of a horizontal bar, to the ends of which the two chains $a\ b$ are fixed. In the hanger B two bearings, $c\ d$, are arranged, preferably in the form of pulleys, over which chains or cords may freely work.

The movable part of the fixture shown in the illustration may be any of the common and well-known constructions, from which two chains, $e\ f$, extend upward, and, passing over the bearing $c\ d$, are connected so as to form a loop over the bearings, the loop or chain being free to work on the bearings.

The lamp is adjusted to different elevations by pulling it down or raising it, as the case may be, in the usual manner.

If in the adjustment of the lamp one chain—say $a$—shall from any cause be wound onto its drum faster than the chain $b$, the result would be to raise that end of the intermediate hanger B accordingly, as indicated in broken lines, Fig. 1; but while the hanger B would necessarily stand in the inclined position there indicated, the chains from the movable part of the fixture will work over the bearings and maintain the lamp in its horizontal position, as also seen in broken lines, Fig. 1, notwithstanding the inclination of the intermediate hanger. The pull upon the lamp downward or in raising is always from the center, and the tendency of such movement is to maintain the horizontal position of the movable part of the fixture; hence the loop in such adjustment will work over the bearings on the intermediate hanger accordingly as the suspending-chains *a b* may vary in their working.

Instead of making the loop from the movable part of the fixture over the bearings, the chains from the lamp may be fixed to the ends of the intermediate hanger, and the loop formed in the chains *a b*, as seen in Fig. 2, with the same result.

While I have described the invention as for the suspending device for lamp-fixtures, it will be understood that the improvement applies to like suspending devices for other articles.

I claim—

1. In an adjustable suspending device for lamps and like purposes, and which consists of two suspending cords or chains extending downward from the drum or drums in the hanger above, the combination therewith of an auxiliary hanger intermediate between the principal hanger and the thing to be suspended, two chains extending upward from the thing to be suspended, the said intermediate hanger fixed to either two of said chains, the other two of the said chains arranged in loop form around bearings in said intermediate hanger and free to run upon said bearings, substantially as described.

2. The combination of the principal hanger A, carrying a drum, two chains, *a b*, extending from said drum downward from opposite sides, two chains, *e f*, extending upward from the thing suspended, the auxiliary hanger B, to which two of said chains are attached, pulleys *c d*, arranged in said auxiliary hanger, the other two of the said chains connected in the form of a loop over said pulleys, substantially as described.

JOHN A. EVARTS.

Witnesses:
CHAS. A. PALMER,
W. R. BOOTH.